Figure 1:
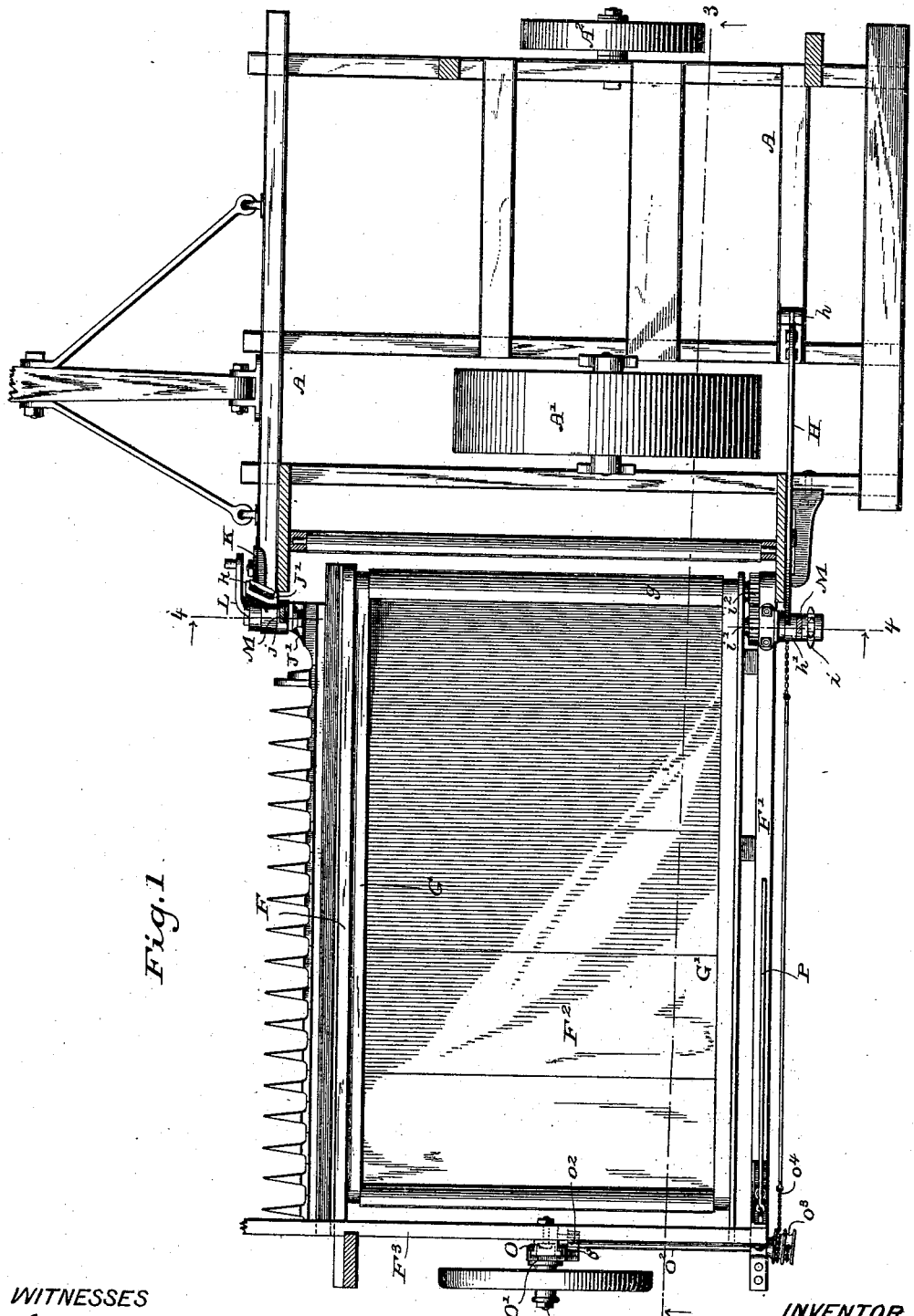

(No Model.) 4 Sheets—Sheet 1.

C. CLAPP.
HARVESTER.

No. 370,609. Patented Sept. 27, 1887.

WITNESSES
Geo W. Young.
Henry A. Lamb.

INVENTOR.
Charles Clapp
By his Attorneys

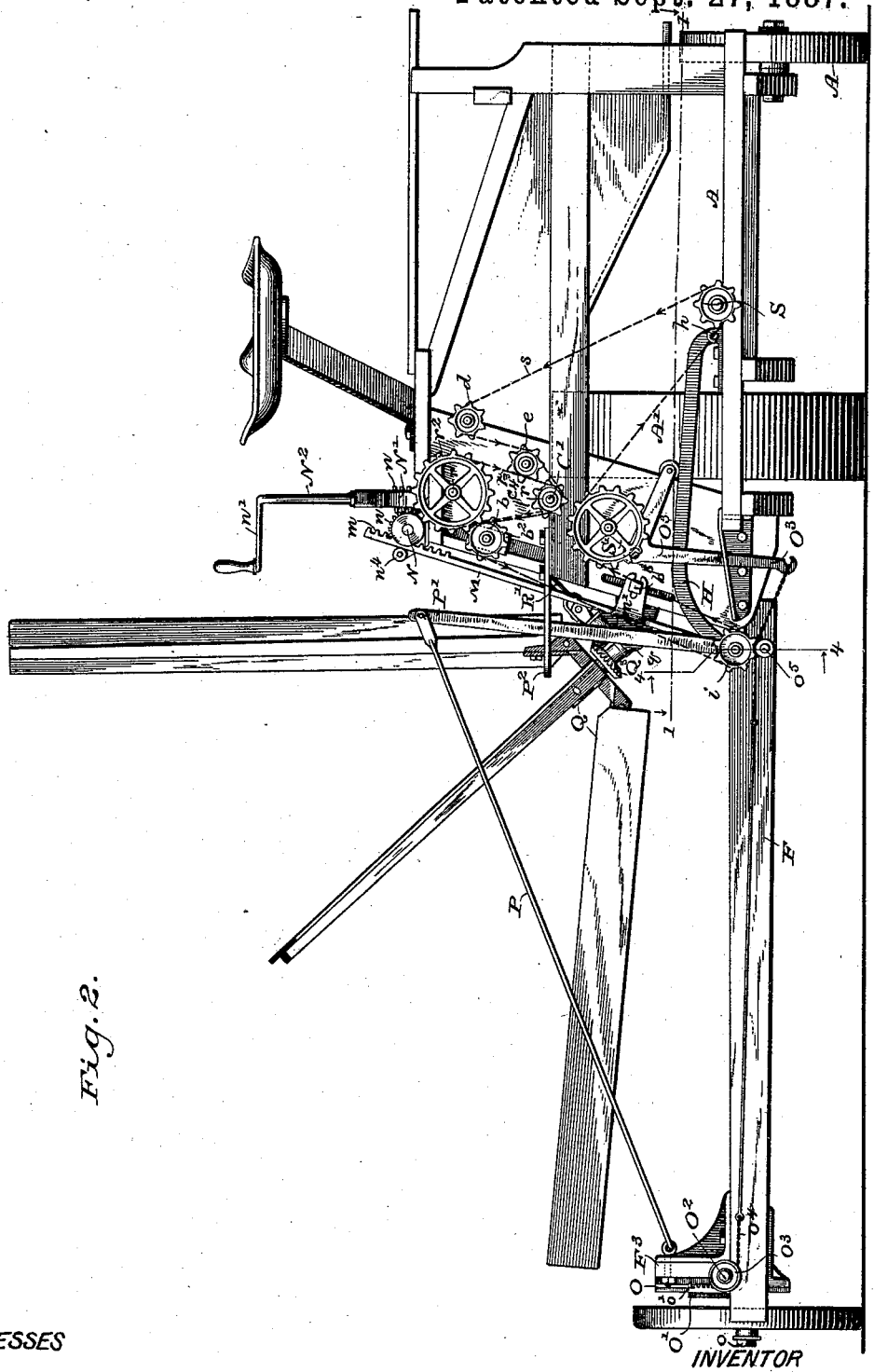

(No Model.) 4 Sheets—Sheet 3.
C. CLAPP.
HARVESTER.
No. 370,609. Patented Sept. 27, 1887.
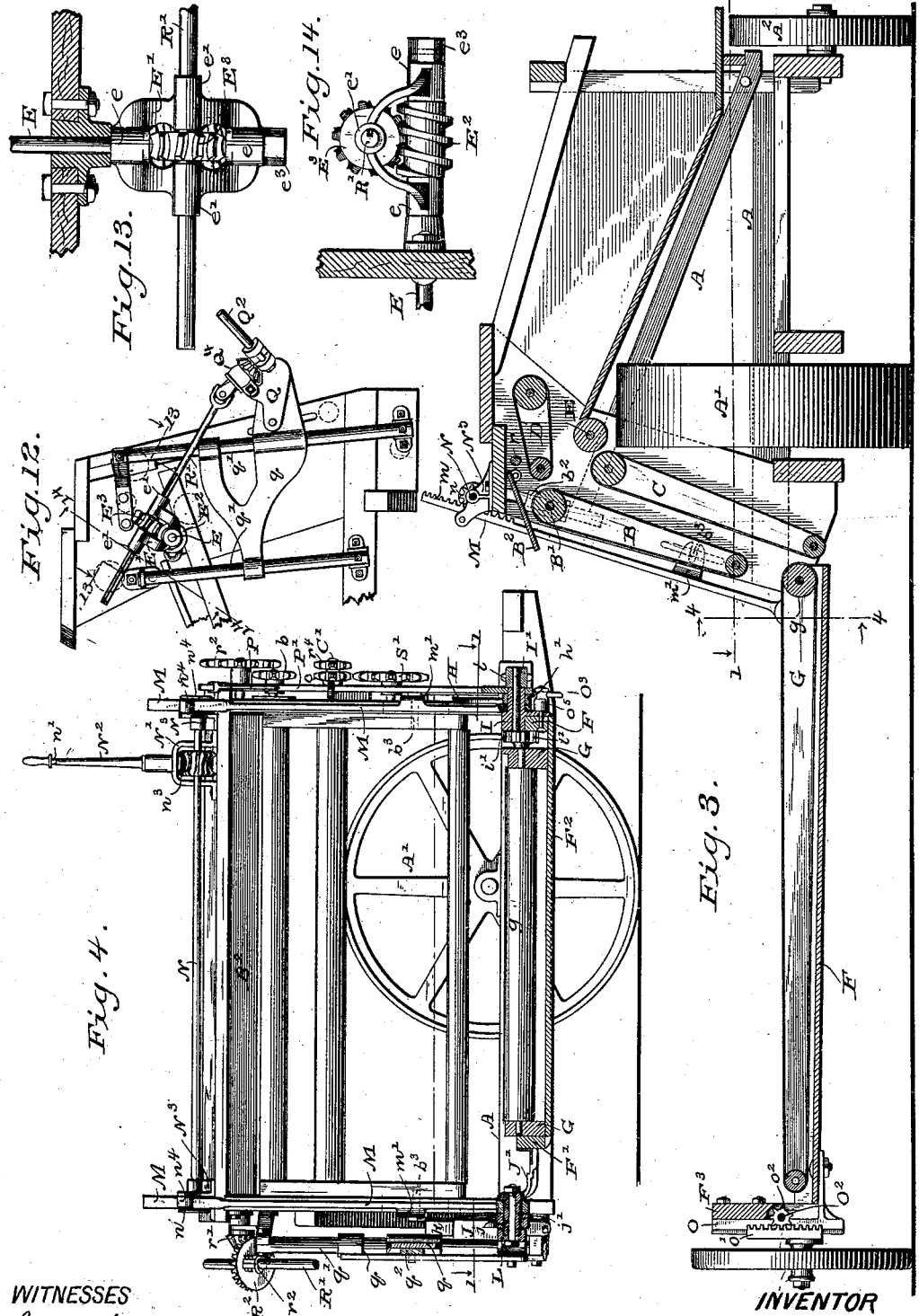
WITNESSES
Geo W Young
Henry A. Lamb
INVENTOR
Charles Clapp.
By his Attorneys
Jannus and Skinkle

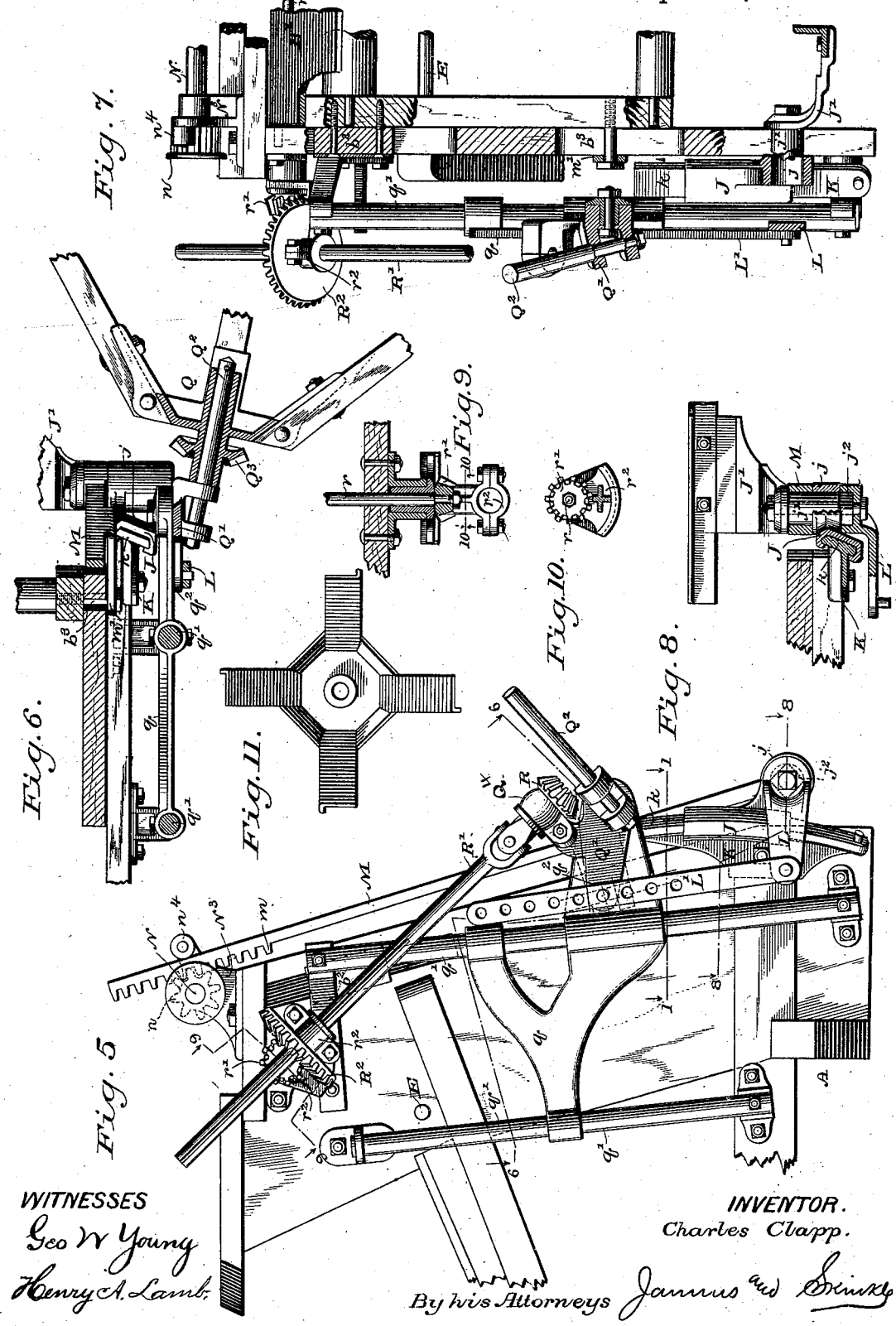

UNITED STATES PATENT OFFICE.

CHARLES CLAPP, OF TRUMANSBURG, NEW YORK, ASSIGNOR TO GREGG & CO., OF SAME PLACE.

HARVESTER.

SPECIFICATION forming part of Letters Patent No. 370,609, dated September 27, 1887.

Application filed July 6, 1886. Serial No. 207,162. (No model.)

*To all whom it may concern:*

Be it known that I, CHARLES CLAPP, a citizen of the United States, residing at Trumansburg, in the county of Tompkins, State of New York, have invented certain new and useful Improvements in Harvesters, of which the following is a description.

My invention has for its object the improvement of grain-binding harvesters of the class in which the platforms are hinged to the main frame—such, for example, as that patented by W. P. Hale August 25, 1885, No. 325,208, and also that shown in my application for a patent on grain-binding harvesters, filed November 19, 1885, Serial No. 183,315.

My present invention is intended to accomplish nearly the same objects as the invention which is sought to be patented by the applicant just referred to, but by other and improved means; and it relates to the manner of hinging the platform to the main frame and adjusting it relatively thereto, to maintaining the proper relative positions of the elevator and platform carrier-belts during such adjustments, so supporting the reel that it will follow the vertical adjustment of the platform as well as the rise and fall of the grain end thereof as it passes over undulating ground, and to raising both ends of the platform simultaneously during vertical adjustment to secure its retaining a horizontal position.

In the accompanying drawings, Figure 1 represents a plan or top view of a harvester embodying my improvements, partly in section, on the line 1 1 of Figs. 2, 3, 4, and 5. Fig. 2 is a rear elevation of the same. Fig. 3 is a vertical longitudinal section on the line 3 3 of Fig. 1. Fig. 4 is a vertical transverse section through the platform and the pivotal points of its connection to the main frame on the line 4 4 of Figs. 1, 2, and 3. Fig. 5 is a detailed front elevation, on an enlarged scale, of a portion of the main frame and the mechanism attached thereto. Fig. 6 is a plan view of the same, partly in horizontal section, on the line 6 6 of Fig. 5. Fig. 7 is an inside elevation of the same, with some of the parts in section and others partly broken away, for purposes of better illustration. Fig. 8 is a detail plan view of the front hinged connection, partly in section, on the line 8 8 of Fig. 5; Fig. 9, a detail sectional view on the line 9 9 of Fig. 5; Fig. 10, a similar view on the line 10 10 of Fig. 9; Fig. 11, a detail view of the reel-head detached. Figs. 12, 13, and 14 are detail views of a modification of the reel-driving devices, in which a worm attached to one of the apron-roller shafts and engaging a worm-wheel on the reel-driving tumbler-shaft is employed instead of mechanism shown in the main figures of the drawings.

In its general features of construction my harvester is similar to that shown in the before-mentioned patent to Hale and my application, No. 183,315, and it need not therefore be minutely described here.

The main frame A is supported, as before, upon the main driving-wheel A', and a small stubble-wheel, A², is provided with elevator-aprons B C, an overhead clearing-apron, D, and a smooth-surfaced clearing-roll, E, the operations of which will be readily understood by reference to said patent and application.

The platform is constructed with the usual front and rear sill-bars, F F', united by bottom boards, F², and by a vertical grain board or divider, F³, to which is attached the guiding and supporting mechanism of the grain-wheel. Within this frame thus formed is mounted the usual apron-roller frame, the front bar, G, of which lies against and is rigidly attached to the front sill of the platform, while the rear bar, G', is provided with spacing-blocks between it and the rear sill, to which it is rigidly attached, the gearing for driving the platform-apron lying within this space inside of the rear frame-bar. (See Fig. 1.) At its rear corner the platform is attached to the main frame by means of a link, H, pivoted at $h$ to the main frame, and provided at its other end with a loop, $h'$, which embraces a hub or bracket, I, rigidly attached to the platform. At its front corner, in axial line with this hub, the platform is pivoted to a sliding block, J, which embraces and slides upon a guide-bracket, K, rigidly attached to the front corner of the main frame. The guide-bar $k$ of this bracket, upon which the block slides, is curved to an arc of a circle, the center of which is coincident with the pivot $h$ of the link H, so that as the platform is raised its front and rear corners will move in parallel lines. It also stands at an angle, as shown, to better adapt it to resist the side drafts and strains to which it may be subjected in pulling the platform along.

The shoe J' of the platform is provided with an arm or journal, $j'$, which passes through a perforated lug, $j$, extending from the sliding block J, and this constitutes the front pivot of the platform. At its front extremity the journal is squared at $j^2$ for the reception of the square socket of a crank-arm, L, to be hereinafter explained. The hub of the bracket I, at the rear corner of the frame, is bored to form a bearing for the apron-driving shaft I', which is provided at its outer end with a chain sprocket-wheel, $i$, and at its inner end with a spur gear-wheel, $i'$, engaging a similar wheel, $i^2$, on the shaft of the apron-driving roller $g$. As the shaft I' does not move in a suitable direction to drive the apron-roller, these two wheels are employed to reverse the direction and give the apron-roller its proper movement.

In order to vertically adjust the platform and support its weight, I employ two separate links, M M, provided with eyes at their lower ends, which embrace the wrist-pins at the front and rear corners of the platform, and with gear-racks $m$ $m$ at their upper ends, which take into spur-pinions $n$ on a shaft, N, mounted in suitable bearings on top of the main frame. A bracket, N', on the top of the frame affords bearings for a vertical shaft, $N^2$, which is provided at its upper end with a crank, $n'$, within easy reach of the driver from the seat, and at its lower end with a worm, $n^2$, which takes into a worm-wheel, $n^3$, on the platform-lifting shaft N. As will be easily understood, the turning of the crank will revolve the shaft, which through its pinions will raise or lower the links connected to the wrist-pins on the platform. The worm and wheel are of such a pitch that they will hold the load at any desired point, thus enabling me to dispense with a rack and locking detent, or such like mechanism. Projecting ears or lugs extend from the bracket-bearings $N^3$, in which the lifting-shaft is mounted, and are provided at their extremities with anti-friction rollers $n^4$, which bear against the outer faces of the racks on the links and hold them into engagement with the pinions.

As in my previously-mentioned application, No. 183,315, the rollers for the upper or outer elevator-apron, B, are mounted in a loose frame capable of endwise movement in suitable guideways in the main frame. These guideways consist of slots cut in the side walls of the main frame, and through them extend guide-blocks, which slide therein. The upper of these guide-blocks, $b^2$, constitute the bearings for the driving-roller shaft B' of the apron, while the lower ones, $b^3$, are shown as consisting merely of bolts, which extend beyond the front and rear outer faces of the main frame. Notched lugs or projections $m'$ from the lifting-links M take over these bolts, and as the links are raised or lowered to effect vertical adjustment of the platform they also raise and lower the elevator-apron frame correspondingly, so that the proper distance between the elevator-apron and the platform is always maintained. A vertical guide-bracket, O, is securely bolted to the grain-board $F^3$, and is provided at each of its sides with a projecting rib or ledge. A movable block, O', provided with a stud-axle, $o$, upon which the grain-wheel is mounted, slides up and down on this guide-bracket, and at its rear side is provided with a gear-rack, $o'$. A shaft, $O^2$, mounted in suitable bearings on the end board has at its forward end a pinion, $o^2$, which takes into the rack on the grain-wheel block, and at its rear end, which projects beyond the rear bar of the platform, with a chain wheel or drum, $o^3$, to which is attached a lifting-chain, $o^4$. At its inner end this chain is attached to the long arm of a bell-crank lever, $O^3$, pivoted at its heel to the main frame and provided at the extremity of its short arm with an anti-friction roller, which rests upon the radius-link H. As the platform is raised or lowered, this link will move the short arm of the lever and cause its longer pendent arm to swing toward or away from the chain-drum at the other end of the platform, and either draw off or pay on the chain wound thereon, thus causing the shaft to revolve and through its pinion, which engages the sliding block, to raise or lower the grain end of the platform.

A guide-roller, $o^5$, over which the chain passes, is mounted on a stud secured to the outer end of the rear sill immediately beneath the wrist or hub I, so that the rising and falling of the outer end of the platform in passing over undulating ground will not materially affect the mechanism to which it is vertically adjusted. As in my before-mentioned application, I employ a link or thrust bar, P, attached to the upper end of a lever, P', pivoted on the hub I and playing through a slotted guide-plate, $P^2$, attached to the main frame, which permits free or independent motion of the grain end of the platform within certain fixed limits and prevents the accidental upsetting of the main frame or its rolling over on the platform. In this case, however, the thrust-bar is attached to the upper end of the lever at a point above the slotted guide-plate instead of below it—a difference merely of convenience and not of principle. The reel Q is mounted upon a block, Q', pivotally connected to a sliding bracket, $q$, mounted upon two guide-bars, $q'$ $q'$, attached to the front of the main frame, as shown by the several figures of the drawings. The reel-head is bored to fit and turn upon a post or stud, $Q^2$, rigidly secured to the pivoted block, as shown, and at a point below where the reel-blades are attached it is provided with a beveled gear-wheel, $Q^3$, by means of which it is driven. A split-bearing, $Q^4$, is formed in the block Q, in which is mounted the hub of a beveled pinion, R, which takes into the wheel Q³ on the reel-head.

To the upper end of the hub is suitably attached a tumbling-shaft, R', the upper end of which is feather-connected to the hub of a beveled wheel, R², intermeshing with a beveled pinion, r', on the front end of the reel-driving shaft r, which is mounted in suitable bearings in the main frame. The beveled wheel R² is supported by a swinging bracket, r², suitably mounted upon the main frame concentrically with the axis of the shaft r, so that vertical adjustment of the reel-supporting head, which will vary the angle of the tumbling-shaft, will not affect the relation of the beveled wheel R² and pinion r'. In order to maintain the proper relations between the reel and platform, the pivoted reel-supporting block has an arm or projection, q², to which is attached one end of a connecting-link, L', the other end of which is connected to the square socketed crank-arm L, fixed to the wrist-pin j' on the shoe of the platform, as before mentioned.

As will be readily understood, the undulatory movements of the outer end of the platform cause the crank-arm L to swing correspondingly, and this, through its link-connection, will vibrate the supporting-block and raise or lower the grain end of the reel to correspond with the rise and fall of that end of the platform.

The reel may be bodily set or adjusted to a greater or less height above the platform, as desired, the link-connection L' being provided with a series of holes, by means of which this point of attachment to the pivoted block Q' may be changed to suit the height of the reel. In order to make such an adjustment, the link is disconnected from the block and the supporting-bracket q moved up or down on its guide-bars to the desired position, when the link is again connected to the block.

I have found in practice that the cross bars or slats fixed to the upper elevator-apron have a tendency to throw the straws above the driving-roller B' out of reach of the overhead apron, D. To prevent such straws from being whipped over the roller B' and out upon the platform again, I pivot between the sides of the main frame a shutter or guard, B², which rests upon the guide-block b² at each end of the apron-frame in close proximity to the surface of the roller, and straws which may accidentally be drawn past the overhead apron, D, will be thrown against this shutter and fall back to a point within the influence of said apron, and by it carried in proper direction on to the binding-table. The shutter being pivoted at one side and supported at the other by the guide-blocks, will rise and fall with the apron-frame and always keep the opening above the roller B' closed. Motion is communicated to the driving-rollers of the platform and elevator-apron, and to the clearing-roll and the reel, by means of a sprocket driving-chain, s, from the constantly-revolving shaft S on the main frame. This chain moves in the direction of the arrows, passing from the driving sprocket-wheel s around the wheel d, which drives the overhead apron, to the wheel e on the clearing-roll, to the wheel c on the lower elevator-apron, to the wheel b on the upper elevator-apron, to the wheel i on the platform, to an idle-wheel, S', mounted on a stud-axle projecting from the main frame, and from thence back to the driving-wheel from whence it started. As will be seen by Fig. 2, the idle-wheel S' and the wheel c are so situated relatively to the wheels i and b on the platform and upper elevator-apron, respectively, that they are nearly on a line drawn between these latter wheels, so that during the vertical adjustment of the platform, as one of the sections of chain b c or i s' is lengthened or shortened, the length of the other section will be oppositely changed to a corresponding degree, and no slackage will occur in the chain by reason of such adjustment, and consequently no take-up mechanism will be necessary.

As before described, the reel is driven by a shaft, r, mounted in suitable bearings in the main frame. This shaft extends beyond the rear side of the frame, and is provided at its extremity with a sprocket-wheel, r², which is connected by a chain, r³, to a smaller sprocket-wheel, r⁴, mounted upon the shaft C' of the lower elevator-apron. A modification of the method of driving the reel is shown in Figs. 12, 13, and 14, in which Fig. 12 is a front elevation of so much of the main frame and reel-stands as is necessary to illustrate the modification; Fig. 13, a view, partly in section, on the line 13 13 of Fig. 12; and Fig. 14, a similar view on the line 14 14 of Fig. 12.

By means of the mechanism here employed I am enabled to dispense with the separate reel-driving shaft r, and communicate motion to the reel by means of the clearing-roller shaft E, which projects beyond the front of the main frame, and has mounted upon it a double-yoked casting, E'. This casting has two bearings, e e, on the shaft E, and in a higher plane two other bearings, e' e', at right angles to the first two, for the reception of the tumbling-shaft R' of the reel-head. A worm, E², is mounted upon the shaft E between the bearings e e, and a feathered worm-wheel, E³, which is engaged by the worm, is on the tumbling-shaft between the bearings e' e'.

It will readily be seen that the yoke will adjust itself to any angle that may be given the tumbling-shaft by the elevation or rocking of the reel-head, and that the shaft will move endwise to its bearings and the worm-wheel whenever a telescopic motion is desired. The yoke is mounted on the shaft E between its bearing in the main frame and a fixed collar, e³, at the extremity of the shaft, thus preventing any endwise motion of the yoke thereon.

Having described my invention, what I claim, and desire to secure by Letters Patent, is—

1. The combination of the main frame, the platform pivoted thereto, the crank arm or lever L, rigidly attached to the journal on the platform, and the reel-supporting block Q', pivotally mounted on the main frame and provided with an extension or lever, $q^2$, connected to the lever L by a link, L', substantially as hereinbefore set forth.

2. The combination of the main frame, the vertically-adjustable platform connected thereto, guide-bars $q'$ $q'$, attached to the frame, a bracket, $q$, mounted and sliding on said bars and supporting the reel-post, and a link, L', connecting said bracket to the platform, substantially as and for the purposes described.

3. The combination of the main frame, the vertically-adjustable grain-platform pivotally connected thereto, the bracket having a hub, I, the apron-driving shaft I', mounted therein concentrically with the pivotal axis of the platform, the sprocket-wheel $i$ on the projecting extremity of the shaft, and the gear-wheels $i'$ $i^2$, located inside of the rear sill of the platform, substantially as and for the purposes set forth.

4. The combination of the main frame, the vertically-adjustable platform connected thereto, the upper elevator-apron vertically adjustable in the main frame to correspond with the adjustment of the platform, the sprocket-wheels $i$ and $b$, which drive the platform and upper elevator-aprons, respectively, and the driving-chain which passes around said wheels and under and over the sprocket-wheels $c$ and $r^4$, respectively, the peripheries of the last-mentioned wheels being substantially in line with the peripheries of the wheels $i$ and $b$, as shown, and for the purpose set forth.

5. The combination of the main frame with a vertically-adjustable grain-platform pivotally connected thereto by a link or radius bar at its rear corner and by a sliding block and guide-bracket at its front corner, substantially as described.

6. The combination of the main frame, a vertically-adjustable platform pivotally connected thereto by a link or radius bar at its rear corner and a sliding block and guide-bracket at its front corner, said bracket being curved about a center coincident with the circle of which the link is a radius, substantially as set forth.

7. The combination of the main frame and the vertically-adjustable grain-platform connected thereto by means of a vertical guide-bracket rigidly attached to the main frame and a sliding block mounted on said bracket and having an ear or projection bored for the reception of an arm or journal rigidly attached to the platform, substantially as set forth.

8. The combination of the main frame, the platform, the sliding block to which the platform is pivoted, and the guide-bracket on the main frame, having its upright guide-bar set at an angle to the line of draft, substantially as and for the purposes hereinbefore set forth.

9. The combination of the main frame, the platform pivotally connected thereto, as described, the lifting-links taking over the arms or journals on the platform and provided at their upper ends with gear-racks, a shaft mounted on the main frame, gear-pinions on the shaft which engage the racks on lifting-links, and means for revolving the shaft, substantially as set forth.

10. The combination of the main frame, the platform, its connections to the frame, the lifting-links, and the lifting-shaft and its pinions, substantially as described, with a worm-wheel secured on the shaft and engaged by a worm mounted on a shaft which is provided at its extremity with a crank, substantially as and for the purposes set forth.

11. The combination of the main frame, the vertically-adjustable platform connected thereto, the link H, and the bell-crank pivoted on the main frame, having one of its arms bearing on the link H and the other connected to a chain through which the vertical adjustment of the grain end of the platform is effected, substantially as set forth.

12. The combination of the main frame, the vertically-adjustable platform connected thereto, the link H, the bell-crank, the connecting-chain attached at one end to the pendent arm of the bell-crank and at the other secured to a winding drum on a shaft mounted in bearings on the grain-board, the pinions also on the shaft, and the sliding grain-wheel-supporting block having a gear-rack which is engaged by the pinion, all for the purpose of effecting vertical adjustment of both ends of the platform simultaneously, as set forth.

13. The combination of the main frame, the vertically-adjustable platform connected thereto, the elevator-apron frame B, loosely mounted in guideways in the main frame, and the lifting-links M, attached to the platform and provided with projecting lugs $m'$, which are connected to the apron-frame, whereby the latter is raised or lowered simultaneously with the platform, substantially as and for the purpose set forth.

14. The combination of the main frame, the fixed lower elevator-apron, the adjustable upper elevator-apron, the overhead clearing-apron, and the shutter or guard pivoted at one edge to the main frame and resting at its free edge on the adjustable frame of the upper elevator above its top roller, substantially as set forth.

In testimony whereof I hereto affix my signature in presence of two witnesses.

CHARLES CLAPP. [L. S.]

Witnesses:
R. VERNAM BARTO,
W. L. OSTROM.